United States Patent
Fondeur et al.

(10) Patent No.: US 6,385,511 B1
(45) Date of Patent: May 7, 2002

(54) METHOD AND DEVICE OF PROCESSING A SIGNAL SENSED ON BOARD A VEHICLE FROM ONE OF ITS WHEELS, AND CORRESPONDING LEARNING METHOD

(75) Inventors: Jean-Christophe Fondeur, Levallois-Perret; Pierre Chastel, Bourron-Marlotte, both of (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/781,242

(22) Filed: Feb. 13, 2001

(30) Foreign Application Priority Data

Jan. 11, 2001 (FR) .............................. 01 00321

(51) Int. Cl.$^7$ ................................ G06F 7/00
(52) U.S. Cl. ............... 701/1; 701/29; 340/447
(58) Field of Search .................. 701/1, 29, 45, 701/49; 340/442, 447

(56) References Cited

U.S. PATENT DOCUMENTS 5,602,524 A 2/1997 Mock et al.
6,181,241 B1 1/2001 Normann et al.

FOREIGN PATENT DOCUMENTS

| EP | 0 626 911 | 11/1995 |
|---|---|---|
| EP | 0 861 159 | 8/1999 |
| FR | 2 774 178 | 7/1999 |

*Primary Examiner*—William A. Cuchlinski, Jr.
*Assistant Examiner*—Edward Pipala
(74) *Attorney, Agent, or Firm*—Larson & Taylor, PLC

(57) ABSTRACT

Detection and transmission modules respectively fitted on several wheels of the vehicle are set up to transmit a detection signal incorporating an indication of a state of the wheel. The sensed signal is compared with several waveforms, respectively stored in relation to wheel positions, in order to select a wheel position for which the stored waveform matches the sensed signal. After pre-processing the sensed signal and identifying extrema of the pre-processed signal, the comparison between the sensed signal and a waveform comprises applying a time transform to the pre-processed signal to align first and second extrema of the pre-processed signal with first and second extrema of said waveform and computing a distance between the transformed signal and said waveform. The wheel position selected is the one for which the computed distance is minimum.

12 Claims, 1 Drawing Sheet

METHOD AND DEVICE OF PROCESSING A SIGNAL SENSED ON BOARD A VEHICLE FROM ONE OF ITS WHEELS, AND CORRESPONDING LEARNING METHOD

BACKGROUND OF THE INVENTION

The present invention relates to wheel location techniques used on certain vehicles whose wheels are fitted with detection and transmission modules.

Such modules take measurements on the wheels and transmit a signal across a wireless link (usually radio) to a reception module installed on board the vehicle to report the measurements or specific conditions detected from the measurements.

The most common application is for measuring tire pressure. However, other parameters may also be measured, for example temperature. The purpose of taking such measurements is to alert the vehicle driver to any abnormal conditions which might occur or simply to make him aware of the measured parameters. For this, it is necessary to give him an indication as to which wheel is concerned.

To this end, a known approach is to incorporate an identifier, characteristic of the wheel, in the signal transmitted by the module mounted on that wheel.

One problem which may arise is that the vehicle wheels can be switched in various repair or maintenance operations, which means that the identifier will no longer enable the driver to locate a wheel on the vehicle.

European patent 0 626 911 describes a device for monitoring the tire pressure of vehicle wheels, in which the receiver is also able to operate in a matching mode in which it establishes a link between each identifier incorporated in the signal by a module and a wheel position. It is necessary to switch to matching mode at least whenever a wheel has been changed. The process is relatively laborious: having manually switched the receiver to matching mode, the operator must deflate or re-inflate a tire in order to determine the detection signal whose measurements reflect the change in pressure; the operator indicates the position of the tire he has deflated or re-inflated and a link is stored in memory between this wheel position and the identifier picked up from the determined detection signal. To avoid these operations, which can not generally be performed by the driver but require a mechanic, the number of receivers can be increased, one being positioned facing each wheel: the position of the receiver which picks up a signal carrying a given identifier with the strongest intensity then provides the information about the corresponding wheel position. However, compared with a single receiver, this solution has the disadvantage of increasing the number of circuits required by the system.

In European patent 0 861 159, it has been proposed to take into account the intensities of the signals received from the wheels in order to eliminate any signals which might have been picked up from another vehicle. It is also proposed that any fluctuations in the intensity of the received signal be examined in order to distinguish between the spare wheel or wheels of the vehicle, which give rise to a constant intensity because they are immobile, and the axle-mounted wheels, from which the intensity varies due to the wheel rotation.

French patent 2 774 118 describes a method in which the processing circuits co-operating with the receiver analyse a signature of the received detection signal in order to allocate the signal to a specific wheel position. Typically, this signature is an intensity profile of the received signal, which differs depending on the position at which the wheel is mounted on the vehicle due to the different obstacles to propagation of the waves. Therefore, a pattern recognition associates a signal with a wheel position. This may be performed from time to time to update or validate the link between an identifier and a wheel position, the distinction then being made on the basis of the detected identifier. An initial learning phase, performed on the actual vehicle or on another vehicle of the same model, is used to determine a reference waveform for each wheel position. The signature observed during the recognition phase is then compared with the different reference waveforms in order to estimate the position of the wheel from which the signal was transmitted.

This pattern recognition process is relatively difficult since the detected signals contain noise and are not in phase with the reference waveforms and they exhibit fluctuations depending on the speed of the vehicle upon transmission of the detection signal, which speed may be different from that at which the reference waveforms were learned. This learning process therefore requires a relatively powerful signal processor, which is detrimental to the cost of the device.

An object of the present invention is to propose a signal processing method that will enable the requisite operations to be simplified, thereby making it possible, in particular, to use relatively simple and economic processing circuits.

SUMMARY OF THE INVENTION

Accordingly, the invention proposes a method of processing a signal sensed by a receiver installed on board a vehicle having a plurality of wheels fitted with respective detection and transmission modules, each detection and transmission module being capable of transmitting a detection signal including an indication of a state of the wheel fitted with said module, wherein the sensed signal is compared with a plurality of waveforms respectively stored in association with wheel positions to select a wheel position for which the stored waveform matches the sensed signal. According to the invention, after pre-processing the sensed signal and identifying extrema of the pre-processed signal, the comparison of the sensed signal with a waveform comprises applying a time transform to the pre-processed signal to align first and second extrema of the pre-processed signal with first and second extrema of said waveform and computing a distance between the transformed signal and said waveform. The wheel position for which the computed distance is minimum is then selected.

The time transform applied to the signal is determined from a limited number of simple parameters, relating to the extrema of the signal and the stored waveforms. The waveform can then be reliably recognised in a relatively limited number of operations.

There are various possible ways of further limiting this number of operations. For example, the position in time and the type (maximum or minimum) of each identified extremum of the pre-processed signal may be ascertained so that the time transform to be applied to align first and second extrema of the pre-processed signal with first and second extrema of a stored waveform is not determined unless the first extrema are of the same type as well as the second extrema.

The waveforms being stored for a reference speed of the vehicle, it is also possible to obtain an indication of the speed of the vehicle at the time the sensed signal is received, ascertain the position in time of each identified extremum of the pre-processed signal and then determine the time transform to be applied to align first and second extrema of the pre-processed signal with first and second extrema of a stored waveform only if the difference in time between the first and second extrema of the pre-processed signal and that between the first and second extrema of said waveform is compatible with the reference speed and the obtained speed indication according to a predetermined compatibility criterion.

Another aspect of the present invention relates to a device for processing a signal sensed by a receiver installed on board a vehicle having several wheels fitted with respective detection and transmission modules, each detection and transmission module being capable of transmitting a detection signal including an indication of a state of the wheel fitted with said module. The device comprises means for pre-processing the sensed signal, means for identifying extrema of the pre-processed signal, and means for comparing the sensed signal with a plurality of waveforms respectively stored in association with wheel positions to select a wheel position for which the stored waveform matches the sensed signal. The means for comparing the sensed signal with a waveform comprise means for applying a time transform to the pre-processed signal to align first and second extrema of the pre-processed signal with first and second extrema of said waveform and means for computing a distance between the transformed signal and said waveform, the wheel position being selected by minimising the computed distance.

A third aspect of the invention relates to a method of learning waveforms for a device for processing a signal sensed by a receiver installed on board a vehicle having several wheels fitted with respective detection and transmission modules, each detection and transmission module being capable of transmitting a detection signal including an indication of a state of the wheel fitted with said module. This method comprises the following steps for each of said vehicle wheels:

recording a substantially periodic reference signal from a detection and transmission module;

determining the period of the reference signal after a pre-processing;

re-sampling a period of the pre-processed reference signal over N points, N being a predetermined number, and storing the re-sampled signal period;

additionally storing the position in time and the type (maximum or minimum) of each extremum within the stored signal period.

The waveforms thus learned are suitable for implementing the signal processing method applied in the recognition phase.

DESCRIPTION OF PREFERRED EMBODIMENTS

Figure 1:
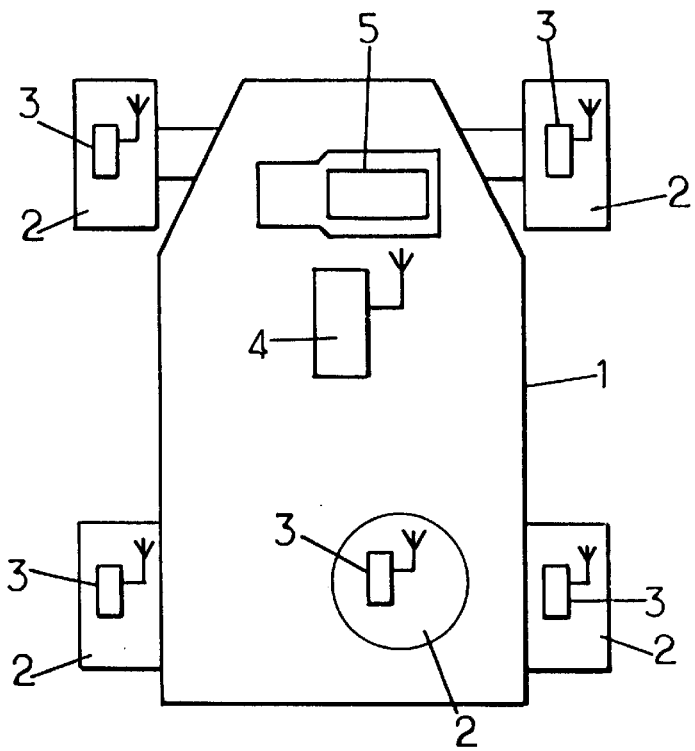
FIG. 1 is a schematic view of a vehicle fitted with a device according to the invention.

Turning to FIG. 1, the method of locating and recognising the position of a wheel is designed for use on a vehicle 1 having wheels 2, each of which is fitted, in a manner known per se, with a detection module 3 emitting a detection signal, which is digitally amplitude- or frequency-modulated, representative of a state of the wheel, in particular the pressure and/or the temperature of a tire mounted on the wheel, towards a processing unit 4 mounted in the vehicle.

Since the modules 3 are mounted on the wheel rims, i.e. at a distance from the rotation axis of the wheels, rotation of the wheels will give rise to a propagation difference in the signals emitted by the modules contained in the right-hand and left-hand wheels. Furthermore, the engine block 5 constitutes an obstacle which modifies the way signals from front modules are propagated in a different way from that in which signals from rear modules are propagated, other elements of the vehicle structure being likely to enhance these differences. The detection signal received by the processing unit is therefore modulated in amplitude.

For the purposes of the invention, this modulation is used to determine a waveform of the detection signal for each wheel position. The waveform is determined, for example, by appropriately filtering and processing the detection signal received by the processing unit 4 during an initial learning phase.

A recognition process is then used to assign the detection signals received by the processing unit 4 to the different wheel positions by running a comparison with the learned and stored waveforms.

Figure 2:
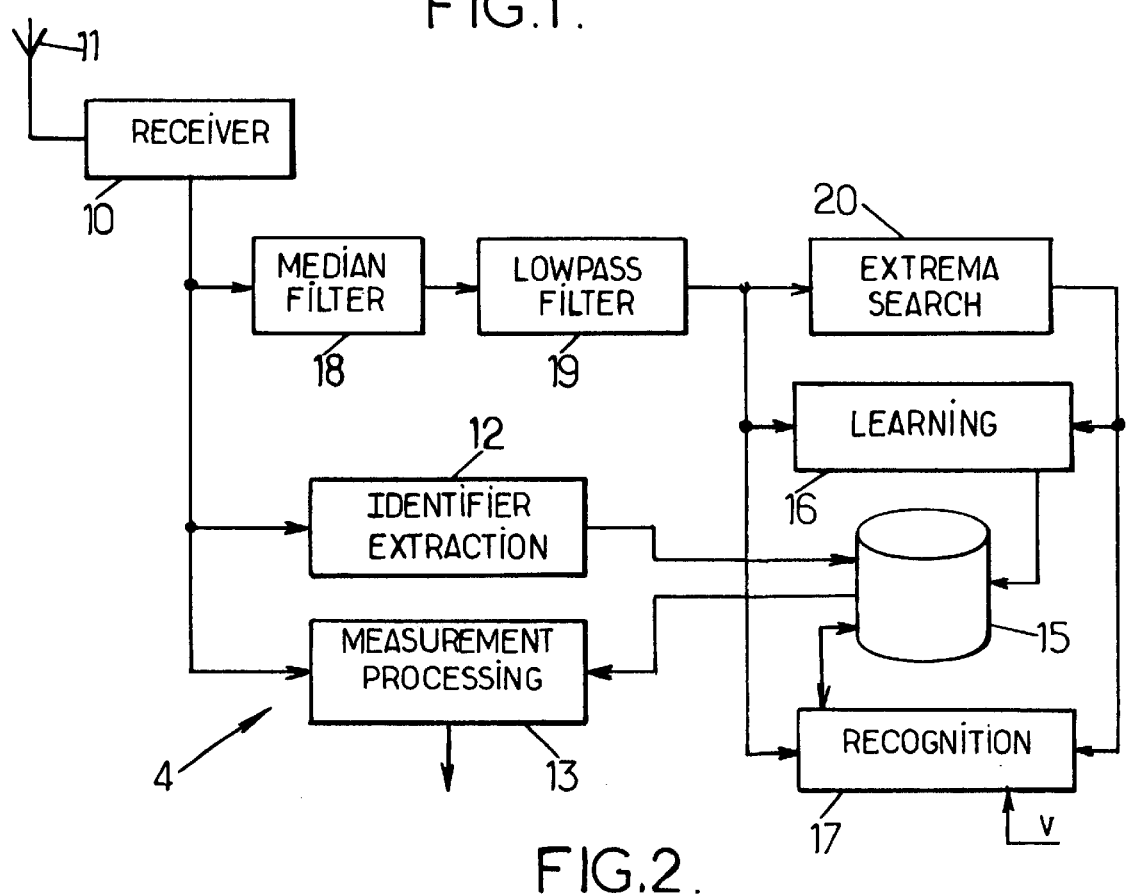
FIG. 2 is a block diagram of a device as proposed by the invention.

FIG. 2 illustrates a possible configuration of the processing unit 4, having a set of modules 13–20. In practice, the unit 4 may consist of a conventional digital signal processor associated with programme instructions functionally corresponding to these different modules 13–20.

A receiver 10 receives the radio signal picked up by the antenna 11 of the unit 4 mounted on board the vehicle, for example underneath the chassis. The receiver 10 runs the requisite analogue processing of the sensed signal and digitises it in readiness for subsequent processing.

In operation, the detection modules 3 transmit a detection signal which may include a header used to acquire the signal and synchronise the receiver, a portion containing an identifier of the module 3 and a portion intended to contain the measurements results. This transmission may be performed regularly or occasionally, when particular conditions are detected.

An extraction module 12 extracts the identifier from the digital signal output by the receiver 10. A measurement processing module 13 manipulates the data transmitted by the detection modules 3 to alert the vehicle driver of any problems that might have been detected or to make him aware of the measured values. The processing module 13 inserts in the communicated information an indication of the position of the relevant wheel, which it retrieves from a matching table stored in a memory 15 on the basis of the identifier extracted by the module 12.

The memory 15 also contains the waveforms recorded during the learning phase. In the example illustrated in FIG. 2, learning is handled by a module 16 of the processing unit 4. This is performed one time only at the factory. In another embodiment, the processing unit 4 might not have a learning module 16, in which case the waveforms will have been learned on a different test vehicle (but of the same model).

In the memory 15, the waveforms relating to the different wheel positions are each associated with a respective identifier likely to be extracted by the module 12. The association is defined by means of a recognition module 17 co-operating with the memory 15.

Modules 16 and 17 operate in conjunction with a preprocessing system for the sensed signal which, in the example illustrated, comprises two successive lowpass; filters 18, 19. The purpose of the first filter 18 is to remove high frequency parasites from the signal. For example, it may apply median type filtering on three successive samples of the sensed digital signal. The second lowpass filter 19 smooths the signal to cancel residual short term fluctuations which might multiply the non-significant extrema of the signal. It may be, e.g., a Butterworth type filter with a finite pulse response of order 6.

A module 20 then searches the extrema of the output signal from the second lowpass filter 19. It identifies each extremum of this signal, by ascertaining its type (maximum or minimum) and its position in time within the received signal (relative to an arbitrary origin).

In the learning phase, the module 16 estimates the period T of the pre-processed signal issued by the lowpass filter 19, this signal being substantially periodic. To this end, the module 16 computes the auto-correlation function of the pre-processed signal for a certain number of delays. In order to lighten the computations, these delays are limited to those corresponding to a difference between the abscissa of two extrema of the same type, as long as this difference is compatible with the speed of the vehicle during the learning phase. Since the radius R of the wheel 2 and the reference speed $v_0$ at which the vehicle was moving during the learning phase are known, a first estimate of the period is derived: $T_1 \approx R/v_0$. This first estimate $T_1$ is rough. It is refined by means of the auto-correlation computation, run for time differences close to the value $T_1$. The period T finally retained is that for which the computed auto-correlation is maximum.

The module 16 then re-samples a period of the pre-processed signal over a number N of sampling points (for example N=64). The list of extrema that were identified by the module 20 within a period is then re-scaled to correspond to the re-sampled waveform. This list of extrema (type, position in time) is recorded in the memory 15 linked to the N samples of the waveform.

The operation described above is repeated for each moving wheel of the vehicle.

In the recognition phase, the module 17 tries to match the pre-processed signal supplied by the filter 19 with each of the waveforms stored in the memory 15.

In an initial step, a correlation between a pair of extrema of a waveform and a pair of extrema of the same type of the pre-processed signal provides a theoretical time shift and time stretching. By preference, in order to limit the amount of computation, only pairs of extrema of the same type are tested, i.e. if the first extrema of the two pairs are of the same type and the second extrema of the two pairs are also of the same type (the two extrema of a pair may, however, be a maximum and a minimum), and which provide a time stretching compatible with the vehicle speed.

In order to test this latter condition, the time difference d between the two extrema of the waveform pair and the time difference D between the two extrema of the pair of the pre-processed signal are considered. The quantity $v_0.d/D$ must be within a speed range including the speed v indicated to the module 17 as being that of the vehicle when carrying out the recognition process. This speed indication v is supplied by a speedometer installed on the vehicle, for example.

One or more transformed signals may therefore be determined for each wheel position. After the time shift and stretching have been applied, a resampling is performed on the whole duration of the corresponding waveform, interpolated if necessary, in order to facilitate comparison with the pre-processed signal. The module 17 then computes a distance between this shifted and stretched signal and the re-sampled waveform. This distance is, for example, the mean quadratic error between the signal and the waveform over N points.

Finally, the module 17 selects the wheel position whose waveform resulted in the smallest of the computed distances. The module 17 then records in the memory 15 the identifier that was extracted from the signal picked up by the module 12, in association with the selected waveform, which is in turn associated with a given position of a wheel relative to the vehicle, specified during the learning process.

Subsequently, when the processing module 13 exploits the measurements transmitted by the detection modules 3, it obtains the position of the transmitting wheel by a look-up into memory 15 on the basis of the identifier extracted by the module 12 from the same signal.

We claim:

1. A method of processing a signal sensed by a receiver installed on board a vehicle having a plurality of wheels fitted with respective detection and transmission modules, each detection and transmission module being capable of transmitting a detection signal including an indication of a state of the wheel fitted with said module, wherein the sensed signal is compared with a plurality of waveforms respectively stored in association with wheel positions to select a wheel position for which the stored waveform matches the sensed signal, wherein the comparison of the sensed signal with a waveform comprises, after pre-processing the sensed signal and identifying extrema of the pre-processed signal, applying a time transform to the pre-processed signal to align first and second extrema of the pre-processed signal with first and second extrema of said waveform to produce a time-transformed signal, whereby the selected wheel position is associated with a stored waveform which most closely matches the time-transformed signal.

2. A method as claimed in claim 1, wherein the pre-processing of the sensed signal comprises at least one lowpass filtering operation.

3. A method as claimed in claim 1, wherein a position in time and a type (maximum or minimum) of each identified extremum of the pre-processed signal are ascertained, and wherein the time transform to be applied to align first and second extrema of the pre-processed signal with first and second extrema of a stored waveform is determined provided the first extrema are of the same type and the second extrema are also of the same type.

4. A method as claimed in claim 1, wherein the waveforms are stored for a reference speed of the vehicle, wherein an indication is obtained of a vehicle speed at the instant said sensed signal is received, wherein a position in time of each identified extremum of the pre-processed signal is ascertained, and wherein the time transform to be applied to align first and second extrema of the pre-processed signal with first and second extrema of a stored waveform is determined provided the ratio between the time difference between the first and second extrema of the pre-processed signal and the time difference between the first and second extrema of said waveform is compatible with the reference speed and the obtained speed indication according to a predetermined compatibility criterion.

5. A method as claimed in claim 1, wherein each of the stored waveforms corresponds to a period of a substantially periodic learning signal.

6. A method as claimed in claim 1, wherein each waveform is stored over a number N of sampling points, wherein the time transform comprises a time shift and a time stretching of the pre-processed signal for aligning said extrema, and wherein the comparison of the sensed signal with said waveform further comprises re-sampling the waveform, computing a distance over N points of the re-sampled waveform and of the transformed signal whereby the closest match is determined on the basis of the distance parameters respectively computed for the plurality of waveforms.

7. A, device for processing a signal sensed by a receiver installed on board a vehicle having several wheels fitted with respective detection and transmission modules, each detection and transmission module being capable of transmitting a detection signal including an indication of a state of the wheel fitted with said module, the device comprising means for pre-processing the sensed signal, means for identifying extrema of the pre-processed signal and means for comparing the sensed signal with a plurality of waveforms respectively stored in association with wheel positions to select a wheel position for which the stored waveform matches the sensed signal, wherein the means for comparing the sensed signal with a waveform comprise means for applying a time transform to the pre-processed signal to align first and second extrema of the pre-processed signal with first and second extrema of said waveform to produce a time-transformed signal, the wheel position being selected as being associated with a stored waveform which most closely matches the time-transformed signal.

8. A device as claimed in claim 7, wherein the pre-processing means comprise at least cone lowpass filter.

9. A device as claimed in claim 7, wherein the means for identifying the extrema of the pre-processed signal comprise means for ascertaining a position in time and a type (maximum or minimum) of each identified extremum of the pre-processed signal, and wherein the comparison means comprise means for determining the time transform to be applied to align first and second extrema of the pre-processed signal with first and second extrema of a stored waveform provided the first extrema are of the same type and the second extrema are also of the same type.

10. A device as claimed in claim 7, arranged to receive a speed indication of the vehicle at the instant said sensed signal is received, wherein the waveforms are stored for a reference speed of the vehicle, wherein the means for identifying the extrema of the pre-processed signal comprise means for ascertaining a position in time of each identified extremum of the pre-processed signal, and wherein the comparison means comprise means for determining the time transform to be applied in order to align first and second extrema of the pre-processed signal with first and second extrema of a stored waveform provided the ratio between the time difference between the first and second extrema of the pre-processed signal and the time difference between the first and second extrema of said waveform is compatible with the reference speed and the received speed indication according to a predetermined compatibility criterion.

11. A device as claimed in claim 7, wherein each waveform is stored over a number N of sampling points, wherein the time transform comprises a time shift and a time stretching of the pre-processed signal for aligning said extrema, and wherein the comparison of the sensed signal with said waveform further comprises re-sampling the waveform and computing a distance parameter over N points of the re-sampled waveform and of the transformed signal whereby the closest match is determined on the basis of the distance parameters respectively computed for the plurality of waveforms.

12. A method of learning waveforms for a device for processing a signal sensed by a receiver installed on board a vehicle having a plurality of wheels each fitted with a respective detection and transmission module, each detection and transmission module being capable of transmitting a detection signal including an indication of a state of the wheel fitted with said module, the method comprising the following steps for each of said vehicle wheels:

recording a substantially periodic reference signal from a detection and transmission module;

determining the period of the reference signal after a pre-processing;

re-sampling a period of the pre-processed reference signal over N points, N being a predetermined number, and storing the re-sampled signal period;

additionally storing a position in time and a type (maximum or minimum) of each extremum within the stored signal period.

* * * * *